United States Patent Office 3,512,554
Patented May 19, 1970

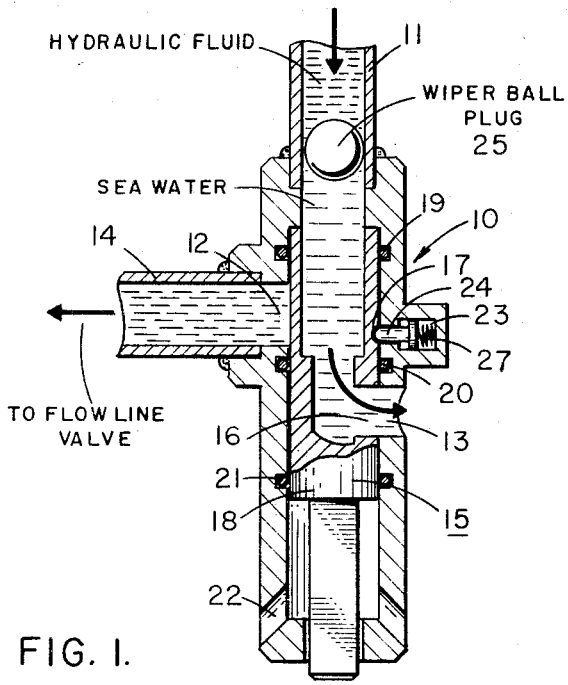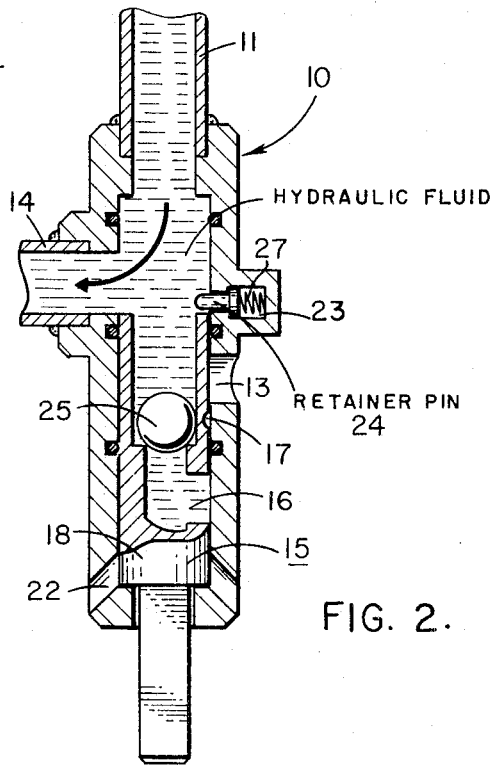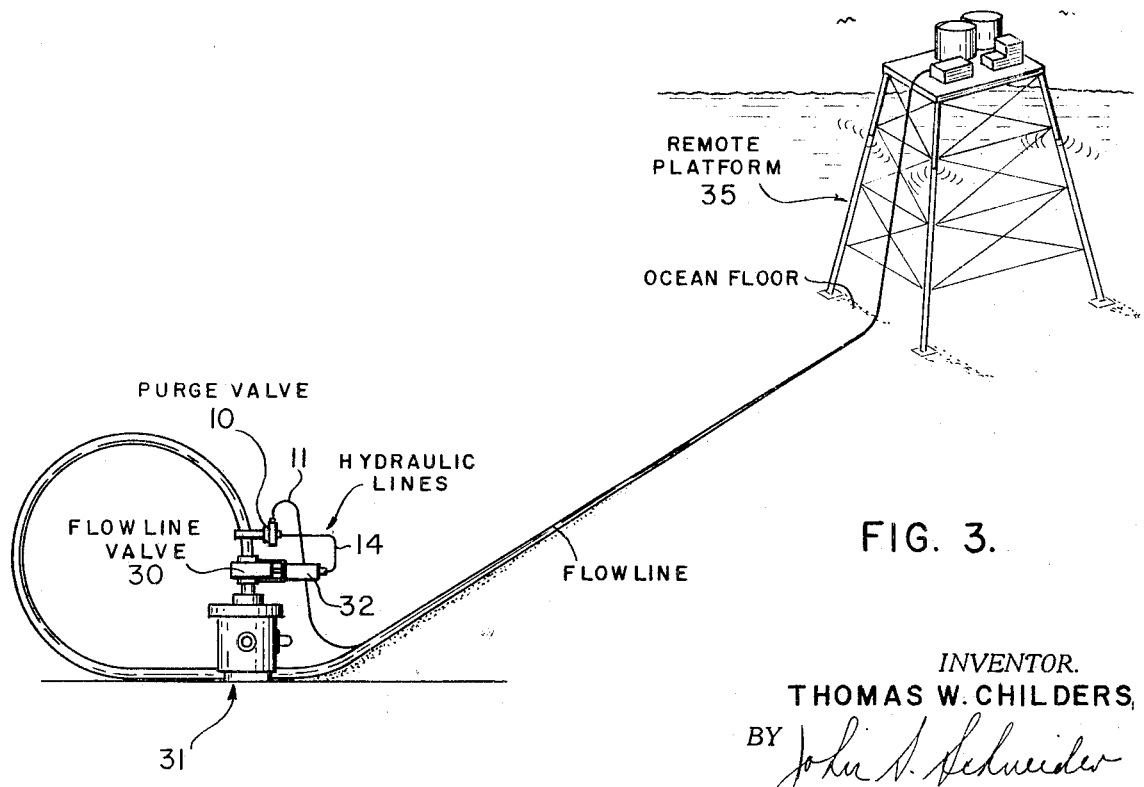

3,512,554
AUTOMATIC PURGE VALVE FOR REMOTE HYDRAULIC CONTROL SYSTEM
Thomas W. Childers, Metairie, La., assignor to Esso Production Research Company
Filed Dec. 18, 1967, Ser. No. 691,362
Int. Cl. B08b 9/02
U.S. Cl. 137—15                    7 Claims

ABSTRACT OF THE DISCLOSURE

An automatically operated purge valve for use in remote hydraulic control systems having a valve body attachable at one end to a hydraulic control flowline extending to a remote source of control fluid and provided with (a) an inlet port, (b) a control side port attachable to a hydraulic control system, and (c) an exhaust side port. A sleeve-type valve element having an exhaust side port is arranged within the valve body and is movable from one position, in which passage of fluid through the control port is prevented and in which the exhaust port in the valve element and the exhaust port in the valve body are aligned to permit flow of fluids from the inlet port through the exhaust ports, to another position in which passage of fluid through the control port is permitted and in which the exhaust port in the valve element is out of alignment with the exhaust port in the valve body to prevent flow of fluid from the inlet port through the exhaust ports. The valve element is moved from the one to the other position thereof by means of a wiper plug pumped by hydraulic control fluid through the hydraulic flowline into the valve body and valve element to plug the port in the valve element and force the valve element to its other position under the force of control fluid pressure. Suitable seals are provided in the valve body to seal off the particular ports and prevent fluid flow around the valve element. In this operation, the hydraulic control line is purged of contaminating fluid and hydraulic control fluid is, upon actuation of the purge valve, immediately diverted through the control port to the control system used to operate underwater apparatus.

BACKGROUND OF THE INVENTION

The present invention is generally concerned with underwater completions, and particularly with hydraulic control equipment for operating remotely positioned underwater apparatus.

It is necessary to purge hydraulic control lines connected to underwater equipment used in underwater well completions of sea water and sediments and fill these control lines with clean hydraulic fluid to assure trouble-free operation of underwater, hydraulically operated valves or other underwater equipment to be operated hydraulically. In present techniques, the hydraulic control lines are filled with clean hydraulic fluid and purged just prior to connecting them to the underwater apparatus; or valves are provided which can be manipulated by a diver to purge the hydraulic control system after connection to the underwater apparatus. Such techniques are cumbersome and require considerable time and expense to accomplish, even in relatively shallow waters. In deep waters such operations are even more costly and difficult to achieve because of diver limitations.

SUMMARY OF THE INVENTION

In accordance with the present invention, a purge valve adapted to be connected in a hydraulic control flowline adjacent control apparatus to be operated by clean hydraulic control fluid comprises a hollow valve body having an inlet, a control fluid port outlet, and an exhaust port, said inlet being attachable to said hydraulic control flowline, and said control fluid port outlet attachable to said control apparatus; a sleeve-type valve element movably arranged within said valve body and provided with an outlet port; said valve element, when in an initial position, closing off said control fluid port outlet in said valve body to flow of fluid therethrough and having said outlet port aligned and in fluid communication with said valve body exhaust port permitting flow of fluid therethrough; said valve element, when in an actuated position, permitting flow of fluid from said inlet through said control fluid port outlet and preventing flow of fluid through said outlet port and said valve body exhaust port. Means are provided for releasably retaining said valve element in its initial position and for locking said valve element in its actuated position. The valve element is hydraulically moved from its initial position to its actuated position by pumping a wiper plug through the hydraulic control flowline into the valve body and valve element to close off the valve element outlet port.

Also, in accordance with the method of the present invention, a hydraulic control flowline used to supply control fluid to operate underwater control apparatus is purged by installing in the hydraulic control line a hydraulically operated purge valve adjacent the control apparatus to be operated by clean hydraulic control fluid. The purge valve has an initial position in which fluid communication between the control apparatus and the hydraulic control flowline is closed off and fluid flow from the hydraulic control flowline to the exterior of the valve is permitted. When it is desired to operate the underwater equipment hydraulically, a wiper plug is pumped through the hydraulic control line followed by clean hydraulic fluid, the wiper plug engages the purge valve and actuates it to close off the exhaust to the exterior of the valve and to open fluid communication between the hydraulic control line and the control apparatus.

A primary object of the present invention is therefore to provide a purge valve which enables purging of hydraulic control lines and establishing control over the underwater apparatus without diver assistance.

The above object and other objects and advantages of the invention will be apparent from a more detailed description of the invention when taken with the drawings.

BRIEF DESCRIPTION OF THE DRAWING

FIG. 1 is a partly sectional view of the purge valve of the invention illustrating the valve in its initial position;
FIG. 2 is a view similar to that shown in FIG. 1 illustrating the valve in its actuated position; and
FIG. 3 is a schematic illustration of the purge valve connected into a hydraulic control system used to control operation of an underwater flowline valve.

DESCRIPTION OF THE PREFERRED EMBODIMENT

In FIGS. 1 and 2 is shown a hollow valve body 10 connected at its inlet end to a hydraulic control flowline 11 and provided with a control fluid outlet port 12 positioned upstream of an outlet or exhaust port 13. Control fluid port 12 is connected to a hydraulic control system including a conduit 14 which is in fluid communication with hydraulic control apparatus used to operate underwater equipment such as an underwater flowline valve, blowout preventer, etc. A movable sleeve-type valve element 15 is arranged within valve body 10 and is provided with an outlet or exhaust port 16 and an indentation 17 in its outer wall. Valve element 15 is open at its upper end and closed at its lower end 18. Valve body 10 is provided with three spaced-apart O-ring seals 19, 20, and 21 adapted to seal off the space between the outer surface of valve element 15 and the inner surface of valve body 10. Seals 19 and 20 seal off such space above and below port 12, and seals 20 and 21 seal off such space above and below port 13. Ports 22 are also provided in valve body 10 for exhausting liquid contained in valve body 10 below the closed end 18 of valve element 15 when valve element 15 moves from its initial to its actuated position.

In the purge position of the valve as illustrated in FIG. 1, the valve traps clean hydraulic fluid in the hydraulic control system by sealing off control port 12 and permits fluids to be pumped through the remote control line 11 and expelled to the atmosphere or water through the aligned exhaust port 16 in valve element 15 and exhaust port 13 in valve body 10. Plunger 24 in that position of the valve releasably engages indentation 17 in valve element 15 to retain valve element 15 in its initial position. Other means for releasably retaining the valve element in its initial position could be used instead. For example, a pin shearable at a selected pressure might be used.

When it is desired to operate the underwater apparatus, wiper ball plug 25 is inserted in the hydraulic control line 11 immediately ahead of the hydraulic control fluid and serves to clean hydraulic control line 11 and maintain the clean and contaminated fluids separate. As seen in FIG. 2, wiper ball plug 25 lodges in its seat closing off flow through side port 16, thereby causing valve element 15 to shift and move to close off exhaust port 13 and open control port 12 to permit fluid flow through the hydraulic control line 11 and conduit 14. When valve element 15 moves to the position illustrated in FIG. 2, plunger 24, biased by spring 27, extends into valve body 10 at the upstream end of valve element 15 to lock valve element 15 in the valve-actuated position.

A typical installation such as is illustrated in FIG. 3 operates as follows. Flowline valve 30 on a christmas tree 31 positioned under the surface of the water is hydraulically controlled by a piston member in cylinder 32 which is moved by fluid pumped through hydraulic line 14. Purge valve body 10 couples conduit 14 and conduit 11. The latter conduit is connected to a remote offshore platform 35. In operation, when it is desired to obtain hydraulic control over flowline valve 30, wiper plug 25 is inserted in conduit 11 at the offshore platform 35 and is pumped by clean hydraulic control fluid through that conduit. The contaminated fluid flows through exhaust port 13 until wiper ball plug 25 seats and closes off that exhaust port. Valve element 15 then is forced to its actuated position shown in FIG. 2 which seals off exhaust port 13 and opens flow to conduit 14 to permit clean hydraulic fluid to move the piston in cylinder 32 and, in that manner, establish control over flowline valve 30.

The purge valve of the invention permits completely filling the system with an uncontaminated hydraulic fluid with a minimum amount of waste and without diver assistance, at the convenience of the operator.

Various modifications may be made in the preferred embodiment of the invention described herein without departing from the scope of the invention as defined by the appended claims.

Having fully described the apparatus, method, objects, and advantages of my invention, I claim:

1. A purge valve adapted to be connected in a hydraulic control flowline adjacent control apparatus to be operated by clean hydraulic control fluid, comprising:
   a hollow valve body having an inlet, a control fluid port outlet, and an exhaust port, said inlet being attachable to said hydraulic control flowline, and said control fluid port outlet being attachable to said control apparatus;
   a sleeve-type valve element movably arranged within said valve body and provided with an outlet port;
   said valve element, when in an initial position, closing off said control fluid port outlet in said valve body to flow of fluid therethrough and having said outlet port aligned and in fluid communication with said valve body exhaust port permitting flow of fluid therethrough;
   said valve element, when in an actuated position, permitting flow of fluid from said inlet through said control fluid port outlet and preventing flow of fluid through said outlet port and said valve body exhaust port; and
   wiper plug means adapted to be pumped through said hydraulic control flowline into said valve body and said valve element to close off said valve element outlet port.

2. A purge valve as recited in claim 1 including seal means aranged in the space between the outer surface of said valve element and the inner surface of said valve body adapted to seal off said space on each side of said valve body control fluid port outlet and said exhaust port.

3. A purge valve as recited in claim 2 including means adapted to releasably retain said valve element in its initial position and lock said valve element in its actuated position.

4. Apparatus including a purge valve connected in a hydraulic control flowline adjacent control apparatus to be operated by clean hydraulic control fluid, comprising:
   a hollow valve body having an inlet, a control fluid port outlet, and an exhaust port, said inlet being connected to said hydraulic control flowline and said control fluid port outlet being connected to said control apparatus;
   a sleeve-type valve element arranged within said valve body and provided with an outlet port;
   said valve element, when in an initial position, closing off said control fluid port outlet in said valve body to flow of fluid therethrough and having said outlet port aligned and in fluid communication with said valve body exhaust port permitting flow of fluid therethrough;
   said valve element, when in an actuated position, permitting flow of fluid from said inlet through said control fluid port outlet and preventing flow of fluid through said outlet port and said valve body exhaust port; and
   wiper plug means adapted to be pumped through said hydraulic control flowline into said valve body and said valve element to close off said valve element outlet port.

5. Apparatus as recited in claim 4 including seal means arranged in the space between the outer surface of said valve element and the inner surface of said valve body adapted to seal off said space on each side of said valve body control fluid port outlet and said exhaust port.

6. Apparatus as recited in claim 5 including means adapted to releasably retain said valve element in its initial position and lock said valve element in its actuated position.

7. A method for purging a hydraulic control flowline used to supply clean control fluid to operate underwater control apparatus comprising the steps of:
   installing in said hydraulic control flowline a hydraulically operated purge valve adjacent said underwater control apparatus to be operated by said clean control fluid;
   said purge valve having an initial position closing off fluid communication between said control apparatus and said hydraulic control flowline, and permitting fluid to exhaust from said hydraulic control flowline to the exterior of said purge valve; and
   pumping a wiper plug means through said hydraulic control flowline followed by said clean control fluid, said wiper plug engaging said purge valve and actuating it to close off exhaust of fluid to the exterior of said purge valve, and to open fluid communication between said hydraulic control flowline and said control apparatus.

References Cited
UNITED STATES PATENTS

| | | | |
|---|---|---|---|
| 3,001,543 | 9/1961 | Barton | 15—104.06 X |
| 3,100,497 | 8/1963 | Woodruff | 137—119 |
| 3,265,083 | 8/1966 | Sachnik | 137—268 |
| 3,331,384 | 7/1967 | Moore | 137—119 |
| 3,358,705 | 12/1967 | Krechel | 137—116 |
| 3,439,697 | 4/1969 | Blanchette | 137—119 |

ALAN COHAN, Primary Examiner

U.S. Cl. X.R.

15—104.06; 137—119, 168, 625.48